United States Patent [19]
Jarrett

[11] Patent Number: 5,607,904
[45] Date of Patent: Mar. 4, 1997

[54] NONIONIC ALKANOLAMIDES AS SHALE STABILIZING SURFACTANTS FOR AQUEOUS WELL FLUIDS

[75] Inventor: Michael Jarrett, Houston, Tex.

[73] Assignee: Baker Hughes Incorporated, Houston, Tex.

[21] Appl. No.: 421,224

[22] Filed: Apr. 13, 1995

[51] Int. Cl.$^6$ .............. C09K 7/06; C09K 3/00; B01F 17/42

[52] U.S. Cl. .......... 507/131; 507/129; 507/239; 507/244; 507/926

[58] Field of Search .............................. 507/131

[56] References Cited

U.S. PATENT DOCUMENTS

| | | | |
|---|---|---|---|
| 2,891,082 | 6/1959 | Steinhauer et al. | 507/131 |
| 3,575,855 | 4/1971 | Estes | 252/8.5 |
| 3,642,623 | 2/1972 | Bennett et al. | 507/131 |
| 4,374,737 | 2/1983 | Larson et al. | 507/131 |

FOREIGN PATENT DOCUMENTS

| | | |
|---|---|---|
| 0430602A1 | 5/1991 | European Pat. Off. . |
| 803544 | 10/1958 | United Kingdom . |

*Primary Examiner*—David B. Springer
*Attorney, Agent, or Firm*—Madan & Morrs, PLLC

[57] ABSTRACT

The present invention provides nonionic alkanolamides which may be added to drilling fluids in order to minimize hydration and prevent erosion loss of water-sensitive shale substrates. Preferred alkanolamides are acetamide mono- and diethanolamines.

20 Claims, No Drawings

NONIONIC ALKANOLAMIDES AS SHALE STABILIZING SURFACTANTS FOR AQUEOUS WELL FLUIDS

FIELD OF THE INVENTION

The present invention is directed to methods for treating drilling fluids to enhance the rate of penetration of the drill bit into water-sensitive clayey shale, and to minimize or eliminate shale destabilization, bit-bailing, torque, and differential sticking when drilling through such shale. In a preferred embodiment, nonionic alkanolamides are added to the drilling fluid. Preferred alkanolamides are acetamide mono- and diethanolamines.

BACKGROUND OF THE INVENTION

Because of environmental concerns, oil-based drilling fluids are less favored than aqueous-based drilling fluids. One problem arises when aqueous-based drilling fluids are used to drill through certain types of shale. Certain water-sensitive clayey shales tend to hydrate very easily. When contacted with an aqueous-base drilling fluid, such shales tend to swell or disperse, creating resistance to bit penetration and fouling of the drilling fluid by the dispersed shale.

Aqueous-based drilling fluids that would not hydrate water-sensitive shales would be highly desirable.

SUMMARY OF THE INVENTION

The present invention provides nonionic alkanolamides which may be added to aqueous-base drilling fluids in order to minimize shale hydration and to prevent erosion loss of water-sensitive shale substrates. Preferred alkanolamides are acetamide mono- and diethanolamines.

DETAILED DESCRIPTION OF THE INVENTION

The present invention involves treating an aqueous-base drilling fluid with a surfactant to induce charge neutralization at the surface of any shale encountered during drilling. The surfactant provides a "hydrophobic" film barrier which minimizes hydration of the shale by water in the drilling fluid. The result is to render the shale more stable and the drilling fluid less susceptible to solids contamination.

The surfactants of the present invention are nonionic alkanolamides having the following general formula:

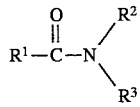

wherein $R^1$ is selected from the group consisting of alkyl groups and an alkenyl groups having between about 1–18 carbon atoms; $R^2$ is selected from the group consisting of hydrogen, ethanol, and propanol; and, $R^3$ is selected from the group consisting of ethanol and propanol. In a preferred embodiment, $R^2$ and $R^3$ are ethanol.

Suitable alkanolamides include, but are not limited to: INCROMECTANT AMEA 100 and INCROMECTANT AMEA-70, acetamide monoethanolamines available from Croda, Parsippany, N.J.; cocamide DEA/DEA dodecylbenzene sulfonate; soyamide diethanolamine; lauric acid diethanolamine, cocamide DEA/DEA tallate; cocamide DEA; oleic acid DEA/DEA oleate; and, lauramide diethanolamine. Acetamide mono- and diethanolamines are preferred because, as the number of carbon atoms in the carbon backbone increases, the more the drilling fluid tends to foam during use. Foaming is undesirable using an aqueous-base drilling fluid, and may be counteracted to some extent using a glycol, such as AQUACOL, available from Baker-Hughes Incorporated, Houston, Tex. Furthermore, the addition of glycol may improve the performance of nonionic alkanolamides, generally, in reducing erosion loss. Therefore, a preferred embodiment involves treating a drilling fluid with both a nonionic alkanolamide and a glycol.

The nonionic alkanolamides of the present invention preferably are added to the aqueous-base drilling fluid at a concentration of about 2 wt %, although a concentration of 1 wt % also appears to be sufficient to minimize shale erosion loss. The surfactants should reduce erosion loss by at least about 10–15%, preferably by at least about 20%, most preferably by about 40–50%. The less the erosion loss, the more cost efficient the use of the surfactant.

The invention will be more clearly understood with reference to the following examples. In the following Tables, NEWDRILL, MIL-PAC, BIODRILL, and BIOLOSE are trademarks for products which may be obtained from Baker Hughes Inteq, Houston, Tex. REV-DUST is a trademark for a product which may be obtained from Mil-White, Houston, Tex.

Experimental Procedures

The "Rolling Dispersion" Test

In the following examples, the effectiveness of the alkanolamide was tested by simulating erosion loss using a "rolling dispersion" test. Basically, 25 g of raw bentonite commercially available as ⅜" chunks was added to a base drilling fluid. The bentonite used in the following examples was HOLE-PLUG, obtained from Baroid Drilling Fluids, Houston, Tex. The drilling fluid/bentonite mixture was rolled for sixteen hours at the given temperature, sieved through 18 mesh screen, and the rheologic properties and fluid loss of the resulting mud were measured. The HOLE-PLUG was retained on an 18 mesh screen, washed, dried, and then reweighed to determine erosion loss.

The amount of bentonite in the drilling fluid simulates the drill cuttings that can be expected from a shale formation when the particular drilling fluid is used. The lower the erosion loss, the lower the solids content, and the more effective the surfactant in protecting the stability of the bentonite. Generally, effectiveness in protecting the bentonite should translate into effectiveness in protecting shale.

The other procedures used in the following experiments are standard API Procedure Nos. RP 10B and 13B.

EXAMPLE 1

In this example, the rolling dispersion test was used to test several weighted seawater-based drilling fluids with and without INCROMECTANT AMEA-100 (acetamide monoethanolamine) to determine the effect of this nonionic alkanolamide on erosion loss. API Procedure Nos. RP 10B and 13B were used to determine the specifics for the various drilling fluids, and the resulting effects of rheological properties, fluid loss, and erosion loss, are given in Table 1:

TABLE 1

Croda INCROMECTANT AMEA-100
in weighted seawater-based formulations

Materials:

| | | | | | | | | |
|---|---|---|---|---|---|---|---|---|
| Seawater, bbl | 0.86 | 0.86 | 0.86 | 0.86 | 0.86 | 0.86 | 0.86 | 0.86 |
| Caustic, lb | 0.5 | 0.5 | 0.5 | 0.5 | 0.5 | 0.5 | 0.5 | 0.5 |
| NEWDRILL PLUS, lb | 2.0 | 2.0 | | | | | | |
| LUVISKOL* K-90, lb | | | 2.0 | 2.0 | | | | |
| Polyvinylalcohol (20%), lb | | | | | 10 | 10 | | |
| MIL-PAC LV, lb | 2.0 | 2.0 | 2.0 | 2.0 | 2.0 | 2.0 | 2.0 | 2.0 |
| BIOZAN,** lb | 0.7 | 0.7 | 0.7 | 0.7 | 0.7 | 0.7 | 0.7 | 0.7 |
| INCROMECTANT AMEA-100, lb | | 7.0 | | 7.0 | | 7.0 | | 7.0 |
| Barite, lb | 204 | 204 | 204 | 204 | 204 | 204 | 204 | 204 |

Stirred 45 min
Add 25 g HOLE-PLUG
Rolled 16 hr, 250° F.

Properties:

| | | | | | | | | |
|---|---|---|---|---|---|---|---|---|
| Plastic Viscosity, cp | 26 | 27 | 21 | 26 | 19 | 20 | 22 | 29 |
| Yield Point, lb/100 sq ft | 24 | 30 | 23 | 24 | 20 | 24 | 27 | 31 |
| 10-sec Gel, lb/100 sq ft | 5 | 6 | 5 | 5 | 4 | 6 | 6 | 8 |
| 10-min Gel, lb/100 sq ft | 7 | 8 | 7 | 7 | 6 | 8 | 8 | 10 |
| API Filtrate, ml | 3.8 | 4.0 | 6.8 | 6.8 | 16 | 6.0 | 12 | 5.6 |
| HOLE-PLUG, g (after wash & dry) | 14.2 | 19.6 | 21.0 | 21.2 | 18.9 | 21.3 | 12.3 | 16.7 |
| Erosion Loss, % | 37.7 | 14.0 | 7.9 | 7.0 | 17.1 | 6.6 | 46.1 | 26.8 |

Note: erosion losses calculated on basis of initial 8.8% moisture content.
*LUVISKOL is a polyvinyl pyrrolidone obtained from BASF, Dusseldorf, Germany.
**BIOZAN is a whelan gum obtained from Kelco Rotary, San Diego, California.

Based on the foregoing, INCROMECTANT AMEA-100 effectively reduced erosion loss, and should be an effective surfactant for use in protecting shale substrates from hydration by aqueous-base drilling fluids.

EXAMPLE 2

In this example, the rolling dispersion test was performed using several weighted freshwater-base drilling fluids with and without INCROMECTANT AMEA-100 (acetamide monoethanolamine). API Procedure Nos. RP 10B and 13B were used to determine the specifics for the various drilling fluids, and the resulting effects of rheological properties, fluid loss, and erosion loss, are given in Table 2:

TABLE 2

Croda INCROMECTANT AMEA-100
in weighted freshwater-based formulations

Materials:

| | | | | | | | | |
|---|---|---|---|---|---|---|---|---|
| Freshwater, bbl | 0.86 | 0.86 | 0.86 | 0.86 | 0.86 | 0.86 | 0.86 | 0.86 |
| NEWDRILL PLUS, lb | 1.0 | 1.0 | | | | | | |
| LUVISKOL K-90, lb | | | 1.0 | 1.0 | | | | |
| Polyvinylalcohol (20%), lb | | | | | 5.0 | 5.0 | | |
| MIL-PAC LV, lb | 1.0 | 1.0 | 1.0 | 1.0 | 1.0 | 1.0 | 1.0 | 1.0 |
| BIOZAN, lb | 0.2 | 0.2 | 0.5 | 0.5 | 0.5 | 0.5 | 0.5 | 0.5 |
| Caustic, lb | 0.2 | 0.2 | 0.2 | 0.2 | 0.2 | 0.2 | 0.2 | 0.2 |
| INCROMECTANT AMEA-100, lb | | 7.0 | | 7.0 | | 7.0 | | 7.0 |
| Barite, lb | 204 | 204 | 204 | 204 | 204 | 204 | 204 | 204 |

Stirred 45 min
Add 25 g HOLE-PLUG
Rolled 16 hr, 250° F.

Properties:

| | | | | | | | | |
|---|---|---|---|---|---|---|---|---|
| Plastic Viscosity, cp | 49 | 40 | O.S. | O.S. | O.S. | O.S. | 112 | 87 |
| Yield Point, lb/100 sq ft | 33 | 40 | O.S. | O.S. | O.S. | O.S. | 66 | 48 |
| 10-sec Gel, lb/100 sq ft | 9 | 10 | 40 | 40 | 40 | 40 | 15 | 16 |
| 10-min Gel, lb/100 sq ft | 13 | 14 | 60 | 60 | 60 | 60 | 20 | 23 |
| API Filtrate, ml | 5.6 | 5.8 | 6.4 | 6.0 | 24 | 38 | 5.0 | 4.6 |
| HOLE-PLUG, g (after wash & dry) | 16.8 | 22.9 | 2.4 | 3.6 | 3.9 | 15.3 | 4.7 | 10.0 |
| Erosion Loss, % | 26.3 | 0 | 89.5 | 84.2 | 82.9 | 32.9 | 79.4 | 56.1 |

Note: erosion losses calculated on basis of initial 8.8% moisture content.

INCROMECTANT AMEA-100 again effectively reduced erosion loss, and should be an effective surfactant for use in protecting shale substrates from hydration by aqueous-base drilling fluids.

EXAMPLE 3

In this example, the rolling dispersion test was performed using unweighted seawater-, freshwater-, and other make-up water-base drilling fluids with and without INCROMECTANT AMEA-100 to determine erosion loss. API Procedure Nos. RP 10B and 13B were used to determine the specifics for the various drilling fluids, and the resulting effects on rheological properties, fluid loss, and erosion loss, are given in Table 3:

EXAMPLE 4

In this example, the rolling dispersion test was performed using unweighted seawater-, freshwater-, and other make-up water-base drilling fluids with and without INCROMECTANT AMEA-70 to determine erosion loss. API Procedure Nos. RP 10B and 13B were used to determine the specifics for the various drilling fluids, and the resulting effects on rheological properties, fluid loss, and erosion loss, are given in Table 4:

TABLE 3

Croda INCROMECTANT AMEA-100 in unweighted formulations, using various make-up waters

| Materials: | | | | | | | | | | |
|---|---|---|---|---|---|---|---|---|---|---|
| Freshwater, bbl | 1.0 | 1.0 | | | | | | | | |
| Seawater, bbl | | | 1.0 | 1.0 | | | | | 1.0 | 1.0 |
| 3% KCl Water, bbl | | | | | 1.0 | 1.0 | | | | |
| 20% NaCl Water, bbl | | | | | | | 1.0 | 1.0 | | |
| Caustic, lb | 0.2 | 0.2 | 0.5 | 0.5 | 0.4 | 0.4 | 0.3 | 0.3 | 0.5 | 0.5 |
| NEWDRILL PLUS, lb | 1.0 | 1.0 | 1.0 | 1.0 | 1.0 | 1.0 | 1.0 | 1.0 | | |
| MIL-PAC LV, lb | 1.0 | 1.0 | 1.0 | 1.0 | 1.0 | 1.0 | 1.0 | 1.0 | 1.0 | 1.0 |
| XCD Polymer, lb* | 0.2 | 0.2 | 0.7 | 0.7 | 0.7 | 0.7 | 1.0 | 1.0 | 1.0 | 1.0 |
| INCROMECTANT AMEA-100, lb | | 7.0 | | 7.0 | | 7.0 | | 7.0 | | 7.0 |
| Stirred 45 min | | | | | | | | | | |
| Add 25 g HOLE-PLUG | | | | | | | | | | |
| Rolled 16 hr, 200° F. | | | | | | | | | | |
| Properties: | | | | | | | | | | |
| Plastic Viscosity, cp | 48 | 46 | 13 | 11 | 9 | 8 | 8 | 9 | 6 | 7 |
| Yield Point, lb/100 sq ft | 30 | 27 | 10 | 13 | 14 | 10 | 6 | 11 | 11 | 13 |
| HOLE-PLUG, g (after wash & dry) | 4.1 | 11.8 | 11.0 | 16.0 | 17.2 | 19.8 | 17.4 | 18.6 | 2.1 | 13.2 |
| Erosion Loss, % | 82.0 | 48.2 | 51.8 | 29.8 | 24.6 | 13.2 | 23.7 | 18.4 | 90.8 | 42.1 |
| Improvement, %, as compared to the control | | 41.2 | | 42.5 | | 46.3 | | 22.4 | | 53.6 |

Note: erosion losses calculated on basis of initial 8.8% moisture content.
*XCD Polymer is xanthan gum obtained from Kelco Rotary, San Diego, California.

INCROMECTANT AMEA-100 was effective to reduce erosion loss in these unweighted drilling fluids.

TABLE 4

Croda INCROMECTANT AMEA-70 in unweighted formulations, using various make-up waters

| Materials: | | | | | | | | | | |
|---|---|---|---|---|---|---|---|---|---|---|
| Freshwater, bbl | 1.0 | 1.0 | | | | | | | | |
| Seawater, bbl | | | 1.0 | 1.0 | | | | | 1.0 | 1.0 |
| 3% KCl Water, bbl | | | | | 1.0 | 1.0 | | | | |
| 20% NaCl Water, bbl | | | | | | | 1.0 | 1.0 | | |
| Caustic, lb | 0.2 | 0.2 | 0.5 | 0.5 | 0.4 | 0.4 | 0.3 | 0.3 | 0.5 | 0.5 |
| NEWDRILL PLUS, lb | 1.0 | 1.0 | 1.0 | 1.0 | 1.0 | 1.0 | 1.0 | 1.0 | | |
| MIL-PAC LV, lb | 1.0 | 1.0 | 1.0 | 1.0 | 1.0 | 1.0 | 1.0 | 1.0 | 1.0 | 1.0 |
| XCD Polymer, lb | 0.2 | 0.2 | 0.7 | 0.7 | 0.7 | 0.7 | 1.0 | 1.0 | 1.0 | 1.0 |
| INCROMECTANT AMEA-70, lb | | 7.0 | | 7.0 | | 7.0 | | 7.0 | | 7.0 |
| Stirred 45 min | | | | | | | | | | |
| Add 25 g HOLE-PLUG | | | | | | | | | | |
| Rolled 16 hr, 200° F. | | | | | | | | | | |

TABLE 4-continued

Croda INCROMECTANT AMEA-70
in unweighted formulations, using various make-up waters Properties:

| | | | | | | | | | |
|---|---|---|---|---|---|---|---|---|---|
| Plastic Viscosity, cp | 52 | 51 | 14 | 10 | 14 | 6 | 8 | 8 | 7 | 6 |
| Yield Point, lb/100 sq ft | 35 | 29 | 10 | 11 | 23 | 8 | 6 | 9 | 10 | 11 |
| HOLE-PLUG, g (after wash & dry) | 4.1 | 11.7 | 16.6 | 20.5 | 9.6 | 20.0 | 17.4 | 19.8 | 4.4 | 12.,5 |
| Erosion Loss, % | 82.0 | 48.7 | 27.2 | 10.1 | 57.9 | 12.3 | 23.7 | 13.1 | 80.7 | 45.2 |
| Improvement, %, as compared to the control | | 40.6 | | 62.9 | | 78.8 | | 44.7 | | 43.6 |

Note: erosion losses calculated on basis of initial 8.8% moisture content.

INCROMECTANT AMEA-70 was effective to reduce erosion loss in these unweighted drilling fluids.

EXAMPLE 5

In this example, the rolling dispersion test was performed on unweighted seawater-, freshwater-, and other make-up water-base drilling fluids containing a reduced treatment level of INCROMECTANT AMEA-70 to determine erosion loss. API Procedure Nos. RP 10B and 13B were used to determine the specifics for the various drilling fluids, and the resulting effects on rheological properties, fluid loss, and erosion loss, are given in Table 5:

EXAMPLE 6

In this example, several weighted seawater-base drilling fluids were tested with and without INCROMECTANT AMEA-70 to determine how the addition of the nonionic alkanolamide affected the density of the drilling fluid. API Procedure Nos. RP 10B and 13B were used to determine the specifics for the various drilling fluids, and the resulting effects on rheological properties, fluid loss, and erosion loss, are given in Table 6:

TABLE 5

Croda INCROMECTANT AMEA-70
at reduced treatment level in unweighted formulations,
prepared with various make-up waters Materials:

| | | | | | | | | |
|---|---|---|---|---|---|---|---|---|
| Freshwater, bbl | 1.0 | 1.0 | | | | | | |
| Seawater, bbl | | | 1.0 | 1.0 | | | 1.0 | 1.0 |
| 3% KCl Water, bbl | | | | | 1.0 | 1.0 | | |
| Caustic, lb | 0.2 | 0.2 | 0.5 | 0.5 | 0.4 | 0.4 | 0.5 | 0.5 |
| NEWDRILL PLUS, lb | 1.0 | 1.0 | 1.0 | 1.0 | 1.0 | 1.0 | | |
| MIL-PAC LV, lb | 1.0 | 1.0 | 1.0 | 1.0 | 1.0 | 1.0 | 1.0 | 1.0 |
| XCD Polymer, lb | 0.2 | 0.2 | 0.7 | 0.7 | 0.7 | 0.7 | 1.0 | 1.0 |
| INCROMECTANT AMEA-70, lb | | 3.5 | | 3.5 | | 3.5 | | 3.5 |

Stirred 45 min
Add 25 g HOLE-PLUG
Rolled 16 hr, 200° F.
Properties:

| | | | | | | | | |
|---|---|---|---|---|---|---|---|---|
| Plastic Viscosity, cp | 58 | 60 | 10 | 10 | 9 | 6 | 7 | 7 |
| Yield Point, lb/100 sq ft | 40 | 30 | 10 | 10 | 10 | 9 | 9 | 10 |
| HOLE-PLUG, g (after wash & dry) | 6.5 | 9.4 | 13.0 | 18.6 | 18.3 | 20.2 | 8.3 | 12.3 |
| Erosion Loss, % | 71.5 | 58.7 | 43.0 | 18.4 | 19.7 | 11.4 | 63.6 | 46.0 |
| Improvement, %, as compared to the control | | 17.9 | | 57.2 | | 42.1 | | 27.7 |
| (also, as compared to performance improvement at 7.0 lb/bbl) | | (41) | | (63) | | (79) | | (44) |

Note: erosion losses calculated on basis of initial 8.8% moisture content.

INCROMECTANT AMEA-70 was effective to reduce erosion loss in these unweighted drilling fluids even at reduced levels.

TABLE 6

Croda INCROMECTANT AMEA-70 in weight-up study

| Materials: | | | | | | | | |
|---|---|---|---|---|---|---|---|---|
| Seawater, bbl | 0.93 | 0.93 | 0.86 | 0.86 | 0.79 | 0.79 | 0.71 | 0.71 |
| Caustic, lb | 0.5 | 0.5 | 0.5 | 0.5 | 0.5 | 0.5 | 0.5 | 0.5 |
| NEWDRILL PLUS, lb | 1.0 | 1.0 | 1.0 | 1.0 | 1.0 | 1.0 | 1.0 | 1.0 |
| MIL-PAC LV, lb | 1.0 | 1.0 | 1.0 | 1.0 | 1.0 | 1.0 | 1.0 | 1.0 |
| XCD Polymer, lb | 1.0 | 1.0 | 0.7 | 0.7 | 0.5 | 0.5 | 0.3 | 0.3 |
| INCROMECTANT AMEA-70, lb | | 7.0 | | 7.0 | | 7.0 | | 7.0 |
| Barite, lb | 94 | 94 | 204 | 204 | 314 | 314 | 421 | 421 |
| REV-DUST, lb | 40 | 40 | 40 | 40 | 40 | 40 | 40 | 40 |
| Stirred 45 min | | | | | | | | |
| Rolled 16 hr, 150° F. | | | | | | | | |
| Properties: | | | | | | | | |
| Density, lb/gal | 10 | 10 | 12 | 12 | 14 | 14 | 16 | 16 |
| Plastic Viscosity, cp | 18 | 18 | 22 | 22 | 35 | 35 | 49 | 60 |
| Yield Point, lb/100 sq ft | 29 | 24 | 36 | 27 | 36 | 30 | 56 | 40 |
| 10-sec Gel, lb/100 sq ft | 8 | 7 | 8 | 7 | 10 | 7 | 17 | 9 |
| 10-min Gel, lb/100 sq ft | 10 | 9 | 11 | 9 | 14 | 10 | 38 | 16 |
| API Filtrate, ml | 4.4 | 5.5 | 5.6 | 6.6 | 8.0 | 8.0 | 10 | 8.2 |

INCROMECTANT AMEA-70 did not have an adverse impact of the density of the drilling fluid.

EXAMPLE 7

In this example, several seawater-base drilling fluids were tested with and without INCROMECTANT AMEA-70 with increasing concentrations of REV-DUST to determine how the addition of the nonionic alkanolamide affected the stability of the drilling fluid to solids contamination. API Procedure Nos. RP 10B and 13B were used to determine the specifics for the various drilling fluids, and the resulting effects on rheological properties, fluid loss, and erosion loss, are given in Table 7:

EXAMPLE 8

In this example, the rolling dispersion test was performed using seawater-base drilling fluids with and without INCROMECTANT AMEA-100, INCROMECTANT AMEA-70, AQUACOL (glycol), and BIODRILL (glycol) to determine the effect that the addition of glycol had on the erosion loss. API Procedure Nos. RP 10B and 13B were used to determine the specifics for the various drilling fluids, and the resulting effects on rheological properties, fluid loss, and erosion loss, are given in Table 8:

TABLE 7

Croda INCROMECTANT AMEA-70 in solids contamination study

| Materials: | | | | | | | | | | |
|---|---|---|---|---|---|---|---|---|---|---|
| Seawater, bbl | 1.0 | 1.0 | 1.0 | 1.0 | 1.0 | 1.0 | 1.0 | 1.0 | 1.0 | 1.0 |
| NEWDRILL HP, lb | 2.0 | 2.0 | 2.0 | 2.0 | 2.0 | 2.0 | 2.0 | 2.0 | 2.0 | 2.0 |
| BIOLOSE, lb | 2.0 | 2.0 | 2.0 | 2.0 | 2.0 | 2.0 | 2.0 | 2.0 | 2.0 | 2.0 |
| XCD Polymer, lb | .75 | .75 | .75 | .75 | .75 | .75 | .75 | .75 | .75 | .75 |
| Barite, lb | 50 | 50 | 50 | 50 | 50 | 50 | 50 | 50 | 50 | 50 |
| AMEA-70, lb | | | | | | 7.0 | 7.0 | 7.0 | 7.0 | 7.0 |
| REV-DUST, lb | | 20 | 40 | 60 | 80 | | 20 | 40 | 60 | 80 |
| Stirred 45 min | | | | | | | | | | |
| Rolled 16 hr, 150° F. | | | | | | | | | | |
| Properties: | | | | | | | | | | |
| Plastic Viscosity, cp | 12 | 12 | 11 | 13 | 17 | 8 | 10 | 13 | 18 | 22 |
| Yield Point, lb/100 sq ft | 16 | 19 | 23 | 27 | 39 | 7 | 8 | 10 | 18 | 23 |
| 10-sec Gel, lb/100 sq ft | 4 | 6 | 8 | 10 | 14 | 2 | 2 | 2 | 4 | 6 |
| 10-min Gel, lb/100 sq ft | 5 | 9 | 11 | 14 | 19 | 3 | 3 | 4 | 5 | 7 |
| API Filtrate, ml | 4.0 | 6.2 | 9.6 | 12 | 24 | 4.8 | 6.0 | 9.8 | 14 | 22 |

INCROMECTANT AMEA-70 improved the resistance of the drilling fluids to solids contamination.

TABLE 8

Evaluation of Croda INCROMECTANT AMEA-100 and AMEA-70 in glycol seawater-based formulations

| Materials | | | | | | | | | | |
|---|---|---|---|---|---|---|---|---|---|---|
| Seawater, bbl | 1.0 | 1.0 | 1.0 | 1.0 | 1.0 | 1.0 | 1.0 | 1.0 | 1.0 | 1.0 |
| Caustic, lb | 0.5 | 0.5 | 0.5 | 0.5 | 0.5 | 0.5 | 0.5 | 0.5 | 0.5 | 0.5 |
| NEWDRILL PLUS, lb | 1.0 | 1.0 | 1.0 | 1.0 | 1.0 | 1.0 | 1.0 | 1.0 | 1.0 | 1.0 |
| MIL-PAC LV, lb | 1.0 | 1.0 | 1.0 | 1.0 | 1.0 | 1.0 | 1.0 | 1.0 | 1.0 | 1.0 |
| XCD Polymer, lb | 0.7 | 0.7 | 0.7 | 0.7 | 0.7 | 0.7 | 0.7 | 0.7 | 0.7 | 0.7 |
| AQUACOL, lb | | 10.5 | 10.5 | 10.5 | 10.5 | | | | | |
| BIODRILL, lb | | | | | | | 10.5 | 10.5 | 10.5 | 10.5 |
| INCROMECTANT AMEA-100, lb | | 7.0 | | | | | | 7.0 | | |
| INCROMECTANT AMEA-70, lb | | | 7.0 | 3.5 | | | | | 7.0 | 3.5 |
| Stirred 45 min | | | | | | | | | | |
| Add 25 g HOLE-PLUG | | | | | | | | | | |
| Rolled 16 hr, 200° F. | | | | | | | | | | |
| Properties: | | | | | | | | | | |
| Plastic Viscosity, cp | 10 | 11 | 10 | 11 | 11 | 10 | 10 | 10 | 10 | 10 |
| Yield Point, lb/100 sq ft | 12 | 12 | 11 | 11 | 11 | 13 | 11 | 14 | 11 | 11 |
| HOLE-PLUG, g (after wash & dry) | 8.6 | 13.0 | 14.0 | 15.8 | 15.6 | 9.9 | 10.9 | 13.7 | 17.3 | 13.9 |
| Erosion Loss, % | 62.3 | 43.0 | 38.6 | 30.7 | 31.6 | 56.6 | 52.2 | 39.9 | 24.1 | 39.0 |
| Improvement,%, as compared to the control | | 31.0 | 38.0 | 50.7 | 49.3 | | 7.8 | 29.5 | 57.4 | 31.1 |

Note: erosion losses calculated on basis of initial 8.8% moisture content.

The presence of the glycol appeared to improve the effectiveness of the INCROMECTANT AMEA-100 and AMEA-70 in reducing erosion loss.

EXAMPLE 9

In this example, seawater-base drilling fluids were tested with and without INCROMECTANT AMEA-70 and AMEA-100 to determine how the nonionic alkanolamide affected the thermal stability of the drilling fluid. API Procedure Nos. RP 10B and 13B were used to determine the specifics for the various drilling fluids., and the resulting effects on rheological properties, fluid loss, and erosion loss, are given in Table 9:

TABLE 9

Croda INCROMECTANT AMEA-100 and AMEA-70 evaluations for thermal stability

| Materials: | | | |
|---|---|---|---|
| Seawater, bbl | 1.0 | 1.0 | 1.0 |
| Caustic, lb | 0.5 | 0.5 | 0.5 |
| NEWDRILL PLUS, lb | 2.0 | 2.0 | 2.0 |
| MIL-PAC LV, lb | 1.0 | 1.0 | 1.0 |
| BIOZAN, lb | 0.7 | 0.7 | 0.7 |
| INCROMECTANT AMEA-100, lb | | 7.0 | |
| INCROMECTANT AMEA-70, lb | | | 7.0 |
| Stirred 45 min | | | |
| Add 25 g HOLE-PLUG | | | |
| Rolled 16 hr, 250° F. | | | |
| Properties: | | | |
| Plastic Viscosity, cp | 7 | 11 | 11 |
| Yield Point, lb/100 sq ft | 10 | 11 | 19 |
| HOLE-PLUG, g (after wash & dry) | 9.5 | 21.6 | 19.0 |
| Erosion Loss, % | 58.3 | 5.3 | 16.7 |
| Improvement, %, as compared to control | | 91.0 | 71.4 |

Note: erosion losses calculated on basis of initial 8.8% moisture content.

The INCROMECTANT AMEA-70 and AMEA-100 continued to significantly improve the thermal stability of these drilling fluids, as evidenced by low erosion losses.

EXAMPLE 10

In this example, a seawater-base drilling fluid was tested with and without INCROMECTANT AMEA-70 according to the following procedure to determine whether the drilling fluid containing the nonionic alkanolamide maintained good rheological and filtration control properties against unwanted contamination. Basically, shale from the field was ground and compressed into wafers initially weighing about 19.6 g. One wafer was dried for 4 hrs at about 107° C. (225° F.); the final weight of the wafer was about 17.1 g. Moisture content was then determined. One wafer was added to each of the drilling fluids and rolled for 16 hrs at 93° C. (200° F.). The resulting wafer was washed, dried, and reweighed to determine erosion loss, and API Procedure Nos. RP 10B and 13B were used to determine the rheological properties of the resulting drilling fluid. The results are given in Table 10:

TABLE 10

Croda INCROMECTANT AMEA-70: Pierre Shale Wafer Test

| Materials: | | |
|---|---|---|
| Seawater, bbl | 1.0 | 1.0 |
| Caustic, lb | 0.5 | 0.5 |
| NEWDRILL PLUS, lb | 1.0 | 1.0 |
| MIL-PAC LV, lb | 1.0 | 1.0 |
| XCD Polymer, lb | 0.7 | 0.7 |
| AMEA-70, lb | | 7.0 |
| Stirred 45 min | | |
| Add one shale wafer (initial weight - 19.6 g); (final weight after drying for 4 hr at 225° F. - 17.1 g); (resultant moisture content- 12.8%) | | |

TABLE 10-continued

Croda INCROMECTANT AMEA-70: Pierre Shale Wafer Test

Rolled 16 hr, 200° F.
Properties:

| | | |
|---|---|---|
| Plastic Viscosity, cp | 8 | 8 |
| Yield Point, lb/100 sq ft | 9 | 11 |
| Shale wafer, g | 13.1 | 14.3 |
| (after wash & dry) | | |
| Erosion Loss, % | 23.4 | 16.3 |
| Improvement, %, as compared to the control | | 30.3 |

The wafer from the drilling mud containing INCROMECTANT AMEA-70 had significantly less erosion loss.

EXAMPLE 11

In this example, the rolling dispersion test was performed using seawater-, freshwater-, and other make-up water-base drilling fluids with and without ALKAMIDE 206-CGN, a cocamide DEA/DEA dodecyl-benzene sulfonate obtained from Rhone-Poulenc, to determine erosion loss. API Procedure Nos. RP 10B and 13B were used to determine the specifics for the various drilling fluids, and the resulting effects on rheological properties, fluid loss, and erosion loss, are given in Table 11:

TABLE 11

Rhone-Poulenc ALKAMIDE 206-CGN

Materials:

| | | | | | | | | |
|---|---|---|---|---|---|---|---|---|
| Freshwater, bbl | 1.0 | 1.0 | | | | | | |
| Seawater, bbl | | | 1.0 | 1.0 | | | 1.0 | 1.0 |
| 3% KCl Water, bbl | | | | | 1.0 | 1.0 | | |
| Caustic, lb | 0.2 | 0.2 | 0.5 | 0.5 | 0.4 | 0.4 | 0.5 | 0.5 |
| NEWDRILL PLUS, lb | 1.0 | 1.0 | 1.0 | 1.0 | 1.0 | 1.0 | | |
| MIL-PAC LV, lb | 1.0 | 1.0 | 1.0 | 1.0 | 1.0 | 1.0 | 1.0 | 1.0 |
| BIOZAN, lb | 0.2 | 0.2 | 0.7 | 0.7 | 0.7 | 0.7 | 1.0 | 1.0 |
| ALKAMIDE 206-CGN, lb | | 7.0 | | 7.0 | | 7.0 | | 7.0 |
| Stirred 45 min | | | | | | | | |
| Add 25 g HOLE-PLUG | | | | | | | | |
| Rolled 16 hr, 200° F. | | | | | | | | |
| Properties: | | | | | | | | |
| Plastic Viscosity, cp | 34 | 78 | 14 | 17 | 9 | 12 | 7 | 10 |
| Yield Point, lb/100 sq ft | 25 | 22 | 19 | 29 | 10 | 14 | 12 | 14 |
| HOLE-PLUG, g | 4.4 | 6.1 | 13.3 | 19.0 | 18.8 | 19.6 | 5.2 | 15.3 |
| Erosion Loss, % | 80.7 | 73.2 | 41.7 | 16.7 | 17.5 | 14.0 | 77.2 | 32.9 |
| Improvement, %, as compared to the control | | 9.3 | | 60 | | 20 | | 57.4 |

Note: erosion losses calculated on basis of initial 8.8% moisture content.

ALKAMIDE 206-CGN was effective to reduce erosion loss using these drilling fluids. Some foaming was noted.

EXAMPLE 12

In this example, the rolling dispersion test was performed using seawater-, freshwater-, and other make-up water-base drilling fluids with and without ALKAMIDE DIN 295/S, a soyamide diethanolamine obtained from Rhone-Poulenc, to determine erosion loss. API Procedure Nos. RP 10B and 13B were used to determine the specifics for the various drilling fluids, and the resulting effects on rheological properties, fluid loss, and erosion loss, are given in Table 12:

TABLE 12

Rhone-Poulenc ALKAMIDE DIN 295/S

Materials:

| | | | | | | | | |
|---|---|---|---|---|---|---|---|---|
| Freshwater, bbl | 1.0 | 1.0 | | | | | | |
| Seawater, bbl | | | 1.0 | 1.0 | | | 1.0 | 1.0 |
| 3% KCl Water, bbl | | | | | 1.0 | 1.0 | | |
| Caustic, lb | 0.2 | 0.2 | 0.5 | 0.5 | 0.4 | 0.4 | 0.5 | 0.5 |
| NEWDRILL PLUS, lb | 1.0 | 1.0 | 1.0 | 1.0 | 1.0 | 1.0 | | |

TABLE 12-continued

| Rhone-Poulenc ALKAMIDE DIN 295/S | | | | | | | | |
|---|---|---|---|---|---|---|---|---|
| MIL-PAC LV, lb | 1.0 | 1.0 | 1.0 | 1.0 | 1.0 | 1.0 | 1.0 | 1.0 |
| XCD Polymer, lb | 0.2 | 0.2 | 0.7 | 0.7 | 0.7 | 0.7 | 1.0 | 1.0 |
| ALKAMIDE DIN 295/S, lb | | 7.0 | | 7.0 | | 7.0 | | 7.0 |
| Stirred 45 min | | | | | | | | |
| Add 25 g HOLE-PLUG | | | | | | | | |
| Rolled 16 hr, 200° F. | | | | | | | | |
| Properties: | | | | | | | | |
| Plastic Viscosity, cp | 47 | 62 | 12 | 11 | 10 | 11 | 7 | 24 |
| Yield Point, lb/100 sq ft | 27 | 47 | 13 | 14 | 15 | 20 | 10 | 17 |
| HOLE-PLUG, g | 2.6 | 10.5 | 11.6 | 19.1 | 15.1 | 16.4 | 3.1 | 13.4 |
| Erosion Loss, % | 88.6 | 53.9 | 49.1 | 16.2 | 33.8 | 28.1 | 86.4 | 41.2 |
| Improvement, %, as compared to the control | | 39.2 | | 67 | | 16.9 | | 52.3 |

Note: erosion losses calculated on basis of initial 8.8% moisture content.

ALKAMIDE DIN 295/S was effective to reduce erosion loss using these fluids. Some foaming was noted.

EXAMPLE 13

In this example, the rolling dispersion test was performed using seawater-, freshwater-, and other make-up water-base drilling fluids with and without ALKAMIDE LE, a lauric acid diethanolamine obtained from Rhone-Poulenc, to determine erosion loss. API Procedure Nos. RP 10B and 13B were used to determine the specifics for the various drilling fluids, and the resulting effects on rheological properties, fluid loss, and erosion loss, are given in Table 13:

EXAMPLE 14

In this example, the rolling dispersion test was performed using seawater-, freshwater-, and other make-up water-base drilling fluids with and without ALKAMIDE DC-212/M, a cocamide DEA/DEA tallate obtained from Rhone-Poulenc, to determine erosion loss. API Procedure Nos. RP 10B and 13B were used to determine the specifics for the various drilling fluids, and the resulting effects on rheological properties, fluid loss, and erosion loss, are given in Table 14:

TABLE 13

| Rhone-Poulenc ALKAMIDE LE | | | | | | | | |
|---|---|---|---|---|---|---|---|---|
| Materials: | | | | | | | | |
| Freshwater, bbl | 1.0 | 1.0 | | | | | | |
| Seawater, bbl | | | 1.0 | 1.0 | | | 1.0 | 1.0 |
| 3% KCl Water, bbl | | | | | 1.0 | 1.0 | | |
| Caustic, lb | 0.2 | 0.2 | 0.5 | 0.5 | 0.4 | 0.4 | 0.5 | 0.5 |
| NEWDRILL PLUS, lb | 1.0 | 1.0 | 1.0 | 1.0 | 1.0 | 1.0 | | |
| MIL-PAC LV, lb | 1.0 | 1.0 | 1.0 | 1.0 | 1.0 | 1.0 | 1.0 | 1.0 |
| XCD Polymer, lb | 0.2 | 0.2 | 0.7 | 0.7 | 0.7 | 0.7 | 1.0 | 1.0 |
| ALKAMIDE LE, lb | | 7.0 | | 7.0 | | 7.0 | | 7.0 |
| Stirred 45 min | | | | | | | | |
| Add 25 g HOLE-PLUG | | | | | | | | |
| Rolled 16 hr, 200° F. | | | | | | | | |
| Properties: | | | | | | | | |
| Plastic Viscosity, cp | 48 | 50 | 11 | 13 | 4 | 10 | 7 | 8 |
| Yield Point, lb/100 sq ft | 26 | 36 | 12 | 15 | 3 | 7 | 11 | 14 |
| HOLE-PLUG, g | 4.6 | 13.3 | 10.9 | 20.8 | 17.5 | 17.7 | 3.9 | 11.7 |
| Erosion Loss, % | 79.8 | 41.7 | 52.2 | 8.8 | 23.2 | 22.4 | 82.9 | 48.7 |
| Improvement, %, as compared to the control | | 47.7 | | 83.1 | | 3.5 | | 41.3 |

Note: erosion losses calculated on basis of initial 8.8% moisture content.

ALKAMIDE LE was effective to reduce erosion loss using these fluids. Some foaming was noted.

TABLE 14

| Rhone-Poulenc ALKAMIDE DC-212/M | | | | | | | |
|---|---|---|---|---|---|---|---|
| Materials: | | | | | | | |
| Freshwater, bbl | 1.0 | 1.0 | | | | | |
| Seawater, bbl | | | 1.0 | 1.0 | | | 1.0 | 1.0 |
| 3% KCl Water, bbl | | | | | 1.0 | 1.0 | |

TABLE 14-continued

| Rhone-Poulenc ALKAMIDE DC-212/M | | | | | | | | |
|---|---|---|---|---|---|---|---|---|
| Caustic, lb | 0.2 | 0.2 | 0.5 | 0.5 | 0.4 | 0.4 | 0.5 | 0.5 |
| NEWDRILL PLUS, lb | 1.0 | 1.0 | 1.0 | 1.0 | 1.0 | 1.0 | | |
| MIL-PAC LV, lb | 1.0 | 1.0 | 1.0 | 1.0 | 1.0 | 1.0 | 1.0 | 1.0 |
| XCD Polymer, lb | 0.2 | 0.2 | 0.7 | 0.7 | 0.7 | 0.7 | 1.0 | 1.0 |
| ALKAMIDE DC-212/M, lb | | 7.0 | | 7.0 | | 7.0 | | 7.0 |
| Stirred 45 min | | | | | | | | |
| Add 25 g HOLE-PLUG | | | | | | | | |
| Rolled 16 hr, 200° F. | | | | | | | | |
| Properties: | | | | | | | | |
| Plastic Viscosity, cp | 47 | 56 | 11 | 10 | 8 | 10 | 5 | 4 |
| Yield Point, lb/100 sq ft | 25 | 30 | 15 | 16 | 12 | 15 | 12 | 11 |
| HOLE-PLUG, g | 2.6 | 8.3 | 12.1 | 22.4 | 16.6 | 20.5 | 2.7 | 20.8 |
| Erosion Loss, % | 88.6 | 63.6 | 46.9 | 1.7 | 27.2 | 10.1 | 88.2 | 8.8 |
| Improvement, %, as compared to the control | | 28.1 | | 96.4 | | 62.9 | | 90.0 |

Note: erosion losses calculated on basis of initial 8.8% moisture content.

ALKAMIDE DC-212/M was effective to reduce erosion loss using these fluids. Some foaming was noted.

EXAMPLE 15

In this example, the rolling dispersion test was performed using seawater-, freshwater-, and other make-up water-base drilling fluids with and without a reduced dosage of ALKAMIDE DC-212/M to determine erosion loss. API Procedure Nos. RP 10B and 13B were used to determine the specifics for the various drilling fluids, and the resulting effects on rheological properties, fluid loss, and erosion loss, are given in Table 15:

TABLE 15

| Rhone-Poulenc ALKAMIDE DC-212/M (at reduced dosage treatment) | | | | | | | | |
|---|---|---|---|---|---|---|---|---|
| Materials: | | | | | | | | |
| Freshwater, bbl | 1.0 | 1.0 | | | | | | |
| Seawater, bbl | | | 1.0 | 1.0 | | | 1.0 | 1.0 |
| 3% KCl Water, bbl | | | | | 1.0 | 1.0 | | |
| Caustic, lb | 0.2 | 0.2 | 0.5 | 0.5 | 0.4 | 0.4 | 0.5 | 0.5 |
| NEWDRILL PLUS, lb | 1.0 | 1.0 | 1.0 | 1.0 | 1.0 | 1.0 | | |
| MIL-PAC LV, lb | 1.0 | 1.0 | 1.0 | 1.0 | 1.0 | 1.0 | 1.0 | 1.0 |
| XCD Polymer, lb | 0.2 | 0.2 | 0.7 | 0.7 | 0.7 | 0.7 | 1.0 | 1.0 |
| ALKAMIDE DC-212/M, lb | | 3.5 | | 3.5 | | 3.5 | | 3.5 |
| Stirred 45 min | | | | | | | | |
| Add 25 g HOLE-PLUG | | | | | | | | |
| Rolled 16 hr, 200° F. | | | | | | | | |
| Properties: | | | | | | | | |
| Plastic Viscosity, cp | 48 | 38 | 13 | 11 | 9 | 12 | 8 | 7 |
| Yield Point, lb/100 sq ft | 37 | 25 | 10 | 14 | 14 | 15 | 9 | 10 |
| HOLE-PLUG, g | 6.5 | 12.2 | 17.9 | 22.1 | 18.4 | 20.9 | 5.1 | 20.9 |
| Erosion Loss, % | 71.0 | 46.0 | 21.0 | 3.0 | 19 | 8.0 | 78 | 8.0 |
| Improvement, %, as compared to the control | | 35 | | 86 | | 58 | | 90 |

Note: erosion losses calculated on basis of initial 8.8% moisture content.

ALKAMIDE DC-212/M was effective to reduce erosion loss even at a reduced level. Some foaming was noted.

EXAMPLE 16

In this example, the rolling dispersion test was performed using seawater-, freshwater-, and other make-up water-base drilling fluids with and without ALKAMIDE DC-212/S, a cocamide DEA obtained from Rhone-Poulenc, to determine erosion loss. API Procedure Nos. RP 10B and 13B were used to determine the specifics for the various drilling fluids, and the resulting effects on rheological properties, fluid loss, and erosion loss, are given in Table 16:

TABLE 16

| Rhone-Poulenc ALKAMIDE DC-212/S | | | | | | | | |
|---|---|---|---|---|---|---|---|---|
| Materials: | | | | | | | | |
| Freshwater, bbl | 1.0 | 1.0 | | | | | | |
| Seawater, bbl | | | 1.0 | 1.0 | | | 1.0 | 1.0 |
| 3% KCl Water, bbl | | | | | 1.0 | 1.0 | | |
| Caustic, lb | 0.2 | 0.2 | 0.5 | 0.5 | 0.4 | 0.4 | 0.5 | 0.5 |
| NEWDRILL PLUS, lb | 1.0 | 1.0 | 1.0 | 1.0 | 1.0 | 1.0 | | |
| MIL-PAC LV, lb | 1.0 | 1.0 | 1.0 | 1.0 | 1.0 | 1.0 | 1.0 | 1.0 |
| XCD Polymer, lb | 0.2 | 0.2 | 0.7 | 0.7 | 0.7 | 0.7 | 1.0 | 1.0 |
| ALKAMIDE DC-212/S, lb | | 7.0 | | 7.0 | | 7.0 | | 7.0 |
| Stirred 45 min | | | | | | | | |
| Add 25 g HOLE-PLUG | | | | | | | | |
| Rolled 16 hr, 200° F. | | | | | | | | |
| Properties: | | | | | | | | |
| Plastic Viscosity, cp | 51 | 46 | 12 | 13 | 9 | 13 | 7 | 9 |
| Yield Point, lb/100 sq ft | 38 | 36 | 10 | 18 | 12 | 21 | 12 | 14 |
| HOLE-PLUG, g | 5.6 | 13.1 | 15.3 | 21.9 | 17.1 | 17.3 | 6.4 | 15.3 |
| Erosion Loss, % | 75.4 | 42.5 | 32.9 | 3.9 | 25.0 | 24.1 | 71.9 | 32.9 |
| Improvement, %, as compared to the control | | 43.6 | | 88.1 | | 3.6 | | 54.2 |

Note: erosion losses calculated on basis of initial 8.8% moisture content.

ALKAMIDE DC-212/S was effective to reduce erosion loss using these fluids. Some foaming was noted.

EXAMPLE 17

In this example, the rolling dispersion test was performed using seawater-, freshwater-, and other make-up water-base drilling fluids with and without ALKAMIDE WRS-166, an oleic acid DEA/DEA oleate obtained from Rhone-Poulenc, to determine erosion loss. API Procedure Nos. RP 10B and 13B were used to determine the specifics for the various drilling fluids, and the resulting effects on rheological properties, fluid loss, and erosion loss, are given in Table 17:

TABLE 17

| Rhone-Poulenc ALKAMIDE WRS-166 | | | | | | | | |
|---|---|---|---|---|---|---|---|---|
| Materials: | | | | | | | | |
| Freshwater, bbl | 1.0 | 1.0 | | | | | | |
| Seawater, bbl | | | 1.0 | 1.0 | | | 1.0 | 1.0 |
| 3% KCl Water, bbl | | | | | 1.0 | 1.0 | | |
| Caustic, lb | 0.2 | 0.2 | 0.5 | 0.5 | 0.4 | 0.4 | 0.5 | 0.5 |
| NEWDRILL PLUS, lb | 1.0 | 1.0 | 1.0 | 1.0 | 1.0 | 1.0 | | |
| MIL-PAC LV, lb | 1.0 | 1.0 | 1.0 | 1.0 | 1.0 | 1.0 | 1.0 | 1.0 |
| XCD Polymer, lb | 0.2 | 0.2 | 0.7 | 0.7 | 0.7 | 0.7 | 1.0 | 1.0 |
| ALKAMIDE WRS-166, lb | | 7.0 | | 7.0 | | 7.0 | | 7.0 |
| Stirred 45 min | | | | | | | | |
| Add 25 g HOLE-PLUG | | | | | | | | |
| Rolled 16 hr, 200° F. | | | | | | | | |
| Properties: | | | | | | | | |
| Plastic Viscosity, cp | 50 | 50 | 10 | 11 | 8 | 10 | 9 | 8 |
| Yield Point, lb/100 sq ft | 36 | 42 | 11 | 12 | 8 | 14 | 11 | 11 |
| HOLE-PLUG, g | 5.0 | 7.6 | 13.1 | 21.9 | 18.3 | 20.1 | 5.2 | 18.4 |
| Erosion Loss, % | 78.1 | 66.7 | 42.5 | 3.9 | 19.7 | 11.8 | 77.2 | 19.3 |
| Improvement, %, as compared to the control | | 14.6 | | 90.8 | | 40.1 | | 75 |

Note: erosion losses calculated on basis of initial 8.8% moisture content.

ALKAMIDE WRS-166 was effective to reduce erosion loss using these fluids. Some foaming was noted.

EXAMPLE 18

In this example, the rolling dispersion test was performed using seawater-, freshwater-, and other make-up water-base drilling fluids with and without CRODA INCROMIDE LR, a lauramide diethanolamine obtained from Croda Inc., Parsippany, N.J., to determine erosion loss. API Procedure Nos. RP 10B and 13B were used to determine the specifics for the various drilling fluids, and the resulting effects on rheological properties, fluid loss, and erosion loss, are given in Table 18:

TABLE 18

Croda INCROMIDE LR

| Materials: | | | | | | | | |
|---|---|---|---|---|---|---|---|---|
| Freshwater, bbl | 1.0 | 1.0 | | | | | | |
| Seawater, bbl | | | 1.0 | 1.0 | | | 1.0 | 1.0 |
| 3% KCl Water, bbl | | | | | 1.0 | 1.0 | | |
| Caustic, lb | 0.2 | 0.2 | 0.5 | 0.5 | 0.4 | 0.4 | 0.5 | 0.5 |
| NEWDRILL PLUS, lb | 1.0 | 1.0 | 1.0 | 1.0 | 1.0 | 1.0 | | |
| MIL-PAC LV, lb | 1.0 | 1.0 | 1.0 | 1.0 | 1.0 | 1.0 | 1.0 | 1.0 |
| XCD Polymer, lb | 0.2 | 0.2 | 0.7 | 0.7 | 0.7 | 0.7 | 1.0 | 1.0 |
| INCROMIDE LR, lb | | 7.0 | | 7.0 | | 7.0 | | 7.0 |
| Stirred 45 min | | | | | | | | |
| Add 25 g HOLE-PLUG | | | | | | | | |
| Rolled 16 hr, 200° F. | | | | | | | | |
| Properties: | | | | | | | | |
| Plastic Viscosity, cp | 49 | 60 | 11 | 11 | 7 | 12 | 6 | 7 |
| Yield Point, lb/100 sq ft | 29 | 45 | 11 | 12 | 9 | 16 | 12 | 10 |
| HOLE-PLUG, g | 4.6 | 8.9 | 16.4 | 21.9 | 18.3 | 18.3 | 7.1 | 15.0 |
| Erosion Loss, % | 79.8 | 61 | 28.1 | 3.9 | 19.7 | 19.7 | 68.9 | 34.2 |
| Improvement, %, as compared to the control | | 23.6 | | 86.1 | | 0 | | 50.4 |

Note: erosion losses calculated on basis of initial 8.8% moisture content.

In all but one of the experiments, INCROMIDE LR was effective to reduce erosion loss using these fluids. No improvement in erosion loss was noted using KCL solution. This may indicate a limitation on the use of INCROMIDE LR. Some foaming was noted.

Persons of skill in the art will appreciate that many modifications may be made to the embodiments described herein without departing from the spirit of the present invention. Accordingly, the embodiments described herein are illustrative only and are not intended to limit the scope of the present invention.

I claim:

1. A method for minimizing hydration and preventing erosion loss of water-sensitive shale substrates by aqueous-base drilling fluids comprising the step of treating an aqueous-base drilling fluid with an effective amount of a nonionic alkanolamide.

2. The method of claim 1 wherein said alkanolamide is selected from the group consisting of a monoethanol amine acetamide; a cocamide diethanolamine/diethanolamine dodecylbenzene sulfonate; a soyamide diethanolamine; a lauric acid diethanolamine; a cocamide diethanolamine/diethanolamine tallate; a cocamide diethanolamine; an oleic acid diethanolamine/diethanolamine oleate; and, a lauramide diethanolamine.

3. The method of claim 1 wherein said alkanolamide comprises the following general structure:

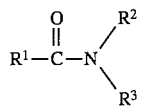

wherein
   $R^1$ is selected from the group consisting of alkyl groups and an alkenyl groups having between about 1–18 carbon atoms;
   $R^2$ is selected from the group consisting of hydrogen, —$CH_2CH_2OH$, and —$CH_2CH_2CH_2OH$; and,
   $R^3$ is selected from the group consisting of —$CH_2CH_2OH$, and —$CH_2CH_2CH_2OH$.

4. The method of claim 3 wherein $R^2$ and $R^3$ are —$CH_2CH_2OH$.

5. A method for minimizing hydration and preventing erosion loss of water-sensitive shale substrates by aqueous-base drilling fluids comprising the step of treating an aqueous-base drilling fluid with an effective amount of a compound selected from the group consisting of monoethanol amine acetamides and diethanolamine acetamides.

6. The method of claim 1 further comprising the step of treating an aqueous-base drilling fluid with an anti-foaming composition.

7. The method of claim 6 wherein said anti-foaming composition comprises a glycol.

8. The method of claim 2 wherein said method further comprises the step of treating an aqueous-base drilling fluid with an anti-foaming composition.

9. The method of claim 8 wherein said anti-foaming composition comprises a glycol.

10. The method of claim 3 wherein said method further comprises the step of treating an aqueous-base drilling fluid with an anti-foaming composition.

11. The method of claim 10 wherein said anti-foaming composition comprises a glycol.

12. The method of claim 4 wherein said method further comprises the step of treating an aqueous-base drilling fluid with an anti-foaming composition.

13. The method of claim 12 wherein said anti-foaming composition comprises a glycol.

14. The method of claim 1 wherein said effective amount comprises at least about 1 wt %.

15. The method of claim 2 wherein said effective amount comprises at least about 1 wt %.

16. The method of claim 3 wherein said effective amount comprises at least about 1 wt %.

17. The method of claim 4 wherein said effective amount comprises at least about 1 wt %.

18. An aqueous-base drilling fluid comprising a nonionic alkanolamide.

19. The drilling fluid of claim 16 wherein said alkanolamide comprises the following general structure:

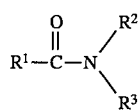

wherein $R^1$ is selected from the group consisting of alkyl groups and an alkenyl groups having between about 1–18 carbon atoms;

$R^2$ is selected from the group consisting of hydrogen, —$CH_2CH_2OH$, and —$CH_2CH_2CH_2OH$; and $R^3$ is selected from the group consisting of —$CH_2CH_2OH$, and —$CH_2CH_2CH_2OH$.

20. The drilling fluid of claim 19 wherein said alkanolamide is selected from the group consisting of monoethanol amine acetamides and diethanolamine acetamides.

* * * * *